United States Patent
Baudart et al.

Patent Number: 6,102,544
Date of Patent: Aug. 15, 2000

[54] MULTIFOCAL OPHTHALMIC LENS

[75] Inventors: Thierry Baudart, Joinville-le-Pont; Francoise Ahsbahs, Saint Maur; Christian Miege, Paris, all of France

[73] Assignee: Essilor International, Cedex, France

[21] Appl. No.: 09/342,946

[22] Filed: Jun. 29, 1999

Related U.S. Application Data

[63] Continuation-in-part of application No. 09/118,947, Jul. 17, 1998.

[51] Int. Cl.[7] ........................... G02C 7/06
[52] U.S. Cl. ........................... 351/169
[58] Field of Search ................. 351/168, 169, 351/170, 171, 172

[56] References Cited

U.S. PATENT DOCUMENTS

| | | | |
|---|---|---|---|
| 4,854,689 | 8/1989 | Dufour et al. | 351/169 |
| 5,270,745 | 12/1993 | Pedrono | 351/169 |
| 5,488,442 | 1/1996 | Harsigny et al. | 351/169 |
| 5,719,658 | 2/1998 | Ahsbahs et al. | 351/169 |
| 5,949,519 | 9/1999 | Le Saux et al. | 351/169 |

OTHER PUBLICATIONS

Guilino, Applied Optics, "Design Philosophy for Progressive Addition Lenses", 32:1:111–117, Jan. 1, 1993.
"Essilor Delta: Lenses for the Proximal Field Too," Opticien Lunetier, Apr. 1988. (Translation attached.)

*Primary Examiner*—Scott J. Sugarman
*Attorney, Agent, or Firm*—Fish & Richardson P.C.

[57] ABSTRACT

In a multifocal ophthalmic lens comprising an aspherical surface having at every point thereon a mean sphere and a cylinder, a far vision region, a near vision region, and an intermediate vision region, the length of progression i.e. the length over which lens power varies by a set amount in different regions of the lens, is short. To avoid distortion at the periphery of the lens which this would otherwise occasion, the isosphere and isocylinder lines are distributed over the surface of the lens so as to ensure variations in sphere are not too sudden along a 20 mm radius circle centered on the geometric center of the lens and variations in cylinder on the surface of the lens inside this circle are also very small. The lens has an enlarged near vision region and progression is less perceptible to the wearer.

37 Claims, 6 Drawing Sheets

MULTIFOCAL OPHTHALMIC LENS

This application is a C-I-P of application Ser. No. 09/118,947 filed Jul. 17, 1998.

BACKGROUND OF THE INVENTION

The present invention relates to a multifocal ophthalmic lens, having an aspherical surface which has a mean sphere and a cylinder at every point thereon, far, near and intermediate vision regions, and a main meridian of progression passing through these three regions.

Such lenses are well known; among multifocal lenses one can distinguish lenses known as progressive lenses adapted to vision at all distances, and lenses that are more specifically dedicated to near vision and intermediate vision.

Progressive multifocal ophthalmic lenses comprise a far vision region, a near vision region, an intermediate vision region, and a main meridian of progression passing through the three regions. French patent application 2,699,294, which is incorporated herein by reference, describes, in its preamble, the various elements of a progressive multifocal ophthalmic lens (main meridian of progression, far vision region, near vision region, etc.), as well as the work carried out by the applicant to improve wearer comfort of such lenses.

Applicant has also proposed, in order to better satisfy the visual needs of long sighted people and to improve comfort of progressive multifocal lenses, to adapt the shape of the main meridian of progression, as a function of the power addition value A (French patent application FR-A--2,683,642).

For such lenses, the power addition value A is defined as the variation in mean sphere between a reference point in the far vision region and a reference point in the near vision region.

Such progressive lenses are generally prescribed as a function of the wearer's ametropia and the power needed for near vision.

Lenses also exist which are more specifically dedicated to near vision; such lenses do not have a a far vision region with a defined reference point like conventional progressive lenses have. Such lenses are prescribed depending on the near vision power the wearer needs, independently of the far vision power. Such a lens is described in an article in the "*Opticien Lunetier*" dated April 1988, and is sold commercially by the applicant under the Essilor Delta trademark; this lens is also as simple to use and easy to wear as a progressive lens, and it is attractive to long-sighted people not fitted with progressive lenses. This lens is also described in Prench patent application FR-A-2,589,973. It has a central portion which is equivalent to the single-focus lens that would normally have been employed for correcting long sightedness, in order to ensure satisfactory near vision. It additionally has a slight decrease in power in the upper portion, ensuring that the wearer also has sharp vision beyond the usual near vision field. Finally, the lens has a point at a power value equal to the nominal power for near vision, a higher power region at the lower portion of the lens, and a lower powered region in the top portion of the lens.

Existing multifocal lenses, whether they be progressive or dedicated to near vision can still be further improved as regards their foveal vision performance, in order to improve wearer comfort. Wearers of multifocal lenses do in fact sometimes feel uncomfortable with dynamic vision. Wearers of multifocal lenses do in fact sometimes feel uncomfortable with dynamic vision, which can cause symptoms such as headache and nausea. Such lenses can also be improved by preserving a near vision region that is sufficiently high to ensure optimum wearer comfort, along with wide visual fields both in near and intermediate vision.

SUMMARY OF THE INVENTION

The present invention provide a mutifocal lens which overcomes the disadvantages of prior art lenses and which ensures improved peripheral vision, while still maintaining good foveal vision performance, thereby facilitating adaptation of wearers to their lenses. The invention nevertheless ensures rapid progression of mean sphere, thereby ensuring the presence of a large near vision area. A balanced distribution of isosphere and isocylinder lines is also achieved.

The invention provides a multifocal ophthalmic lens comprising an aspherical surface having at every point thereon a mean sphere and a cylinder, said lens having a power addition and comprising a far vision region VL, a near vision region VP, an intermediate vision region VI, a main meridian of progression MM' passing through said three regions, and a power addition, in which a principal length of progression as defined herein is shorter than 16 mm, a maximum value $|dS/d\theta|_{max}$ of a modulus of the tangential derivative of mean sphere on a 40 mm diameter circle centered on a geometric center of said lens is less than one quarter of the maximum value $P_{mer}$ of a slope of mean sphere along said meridian:

$$|dS/d\theta|_{max}/P_{mer} < 0.25$$

a maximum value $C_{max}$ of cylinder inside said circle is less than a nominal power addition of said lens:

$$C_{max} < A_{nom}.$$

Advantageously, the main meridian of progression is made up by mid-points of horizontal segments joining respective lines formed by points where cylinder is 0.50 diopter.

The near vision region, delimited in an upper portion of said lens by lines formed by points where cylinder is equal to half power addition can have a width that is greater than 14.5 mm at a point of reference for near vision.

The far vision region defined in an upper portion of said lens by Lines formed by points where cylinder is equal to half power addition, preferably contains at least one angular sector formed by two upwardly-directed half-lines originating at a geometric center of said lens and having an included angle of at least 150°.

Preferably, cylinder at the surface of said lens is less than power addition, preferably less than 90% of power addition.

Advantageously, the difference in maximum cylinder values at the two portions of said lens delimited by the main meridian of progression is less than 0.1 diopters, and is preferably less than 0.05 diopters.

In one embodiment, the lens is a multifocal lens dedicated to near vision and intermediate vision, said lens having a power addition defined as a difference between maximum and minimum values of mean sphere on said meridian of progression, inside a 20 mm radius circle centered on the geometric center of said lens.

In this case, the principal length of progression is defined as a ratio between power addition and a maximum value of slope of mean sphere $P_{mer}$ along said meridian.

In another embodiment, the lens is a progressive multifocal lens having a reference point for a near vision region, a reference point for a far vision region, and a power addition defined as a difference between the values of mean sphere at these two points.

In this case, the principal length of progression is defined as a difference in height between a mounting center and a point on said meridian at which mean sphere is equal to the sum of mean sphere at said reference point for far vision, plus 85% of said power addition.

Further features and advantages of the present invention will become more clear from the description which follows of one embodiment of the invention provided by way of non-limiting example with reference to the attached drawings.

DETAILED DESCRIPTION OF PREFERRED EMBODIMENT

Below, we shall employ an orthonormal coordinate system in which the x-axis corresponds to the horizontal axis of the lens and the y-axis corresponds to the vertical axis; the centre O of the reference frame is the geometric center of the lens.

Figure 1:
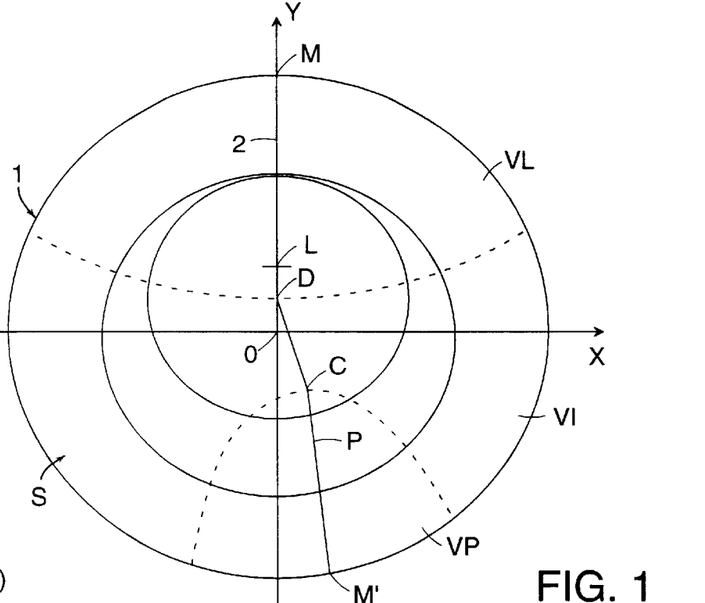
FIG. 1 is a diagrammatical front view of a multifocal progressive lens.

FIG. 1 is a diagrammatical front view of a known progressive ophthalmic lens, showing the various elements thereof.

FIGS. 2 to 5 show the optical characteristics of the lens according to the invention, this lens having a diameter of about 60 mm. In FIGS. 2 to 5, we have described a lens having a power addition of one diopter.

FIGS. 6 to 11 show a similar view, for lenses having a power addition of 2 or 3 diopters.

With reference to FIG. 1, the various elements of a multifocal ophthalmic lens will now be described. Such a lens generally has an aspherical face shown in FIG. 1 and a second face which can be aspherical or toroidal.

For every point on the aspherical surface, a mean sphere D is defined from the formula:

$$D = \frac{n-1}{2}\left(\frac{1}{R_1} + \frac{1}{R_2}\right)$$

in which:

$R_1$ and $R_2$ are the maximum and minimum radii of curvature expressed in meters, and n is the refractive index of the lens material.

Cylinder C is defined by the formula:

$$C = (n-1)\left|\frac{1}{R_1} - \frac{1}{R_2}\right|$$

Isosphere lines are lines constituted by the projection onto a plane tangential to the progressive surface at the geometric centre O of points on the lens surface having the same value of mean sphere. Similarly, isocylinder lines are lines constituted by the projection onto this same plane of points having the same cylinder.

Conventionally, the lens 1 comprises in its upper portion a far vision region VL, in its lower portion a near vision region VP and, between these two regions, an intermediate region VI. For a progressive lens, a reference point P is defined in the near vision region at which near vision is measured and a reference point L at which far vision is measured. For a lens dedicated to near vision, a reference point P is defined in the near vision region for measuring near vision; however, no corresponding reference point is defined for the far vision region.

On FIG. 1, the main meridian of progression 2 of the lens is shown, passing through the far vision region, the intermediate vision region and the near vision region. This meridian is defined as the locus of the mid-points of horizontal segments delimited by the 0.50 diopter isocylinder line. In the example of FIG. 1, the meridian is essentially composed of three segments, the first one extending substantially vertically from the top of the lens, passing through the point L, down to a point D, referred to as the fitting centre, and located between the far vision control point L and the geometric centre O. The second segment extends from point D obliquely towards the nasal side of the lens, and the third segment starts from the end C of the second segment and passes through the near vision control point P. Other forms of meridian are possible.

In the case of progressive multifocal ophthalmic lenses, a power addition is defined in a manner known per se, this being the difference in mean sphere between a reference point P in the near vision region and a reference point L in the far vision region.

For multifocal lenses dedicated to near vision and intermediate vision, minimum and maximum values of sphere are measured on the meridian thus defined within the bounds of a 20 mm radius circle centered on the geometric center of the lens. The power addition is now the difference between these minimum and maximum values of sphere; this definition is substantially equivalent, for progressive lenses, to the conventional definition of power addition and being the difference in sphere between the reference points for near and far vision.

With these definitions, it is generally considered that the limit of the far vision region in the upper portion of the lens is formed by isocylinder lines of a value equal to half the power addition. Similarly, the limit of the near vision region in the lower portion of the lens is set by isocylinder lines of a value equal to half the power addition.

The inner circle shown on FIG. 1, represents the region scanned by the eye when performing everyday tasks. The size and position of this portion, known as the foveal vision region has been determined by numerous series of measurements carried out in the applicant's laboratories; reference can example be made to IEEE, Portable eye movement recorder by T. Bonnin and N. Bar, Proceedings of the 14th annual international conference of the IEEE Engineering in Medicine and Biology Society 3 1992, part 4, pages 1668 to 1669, to AAO 1993, to "Optimization of ophthalmic aspheric lenses: recording of eye movement for everyday tasks", N. Bar, T. Bonnin and C. Pedreno, Optometry arid vision science 1993, No. 12s, volume 70 page 154, or yet again to ECEM 93, "The use of visual space", a poster by N Bar. This region covers a 30 m diameter disc centered on the mounting center.

To ensure maximum visual comfort for the wearer, we consider the 40 mm diameter disc centered on the geometric center of the lens, which encompasses the foveal vision region and we have set out to limit tangential variations in sphere along this circle. Controling variations in sphere along this circle makes it possible to master deformations in the optical characteristics of the multifocal surface; the wearer's peripheral vision is thus improved. It is also desirable to overcome defects such as cylinder inside the 40 mm circle top ensure, as far as possible, sharp vision inside the foveal region. This circle is shown in FIG. 1 and in FIGS. 3, 7 and 10.

In order to improve the gentleness of progression of the lenses, and to facilitate wearers adapting to the lens, the present invention and sets out to consider a new definition of the characteristics of the lens surface, explained with reference to the following figures. The figures cover the case of progressive multifocal lenses; the invention applies *mutatis mutandis* to multifocal lenses dedicated to near vision.

Figure 2:
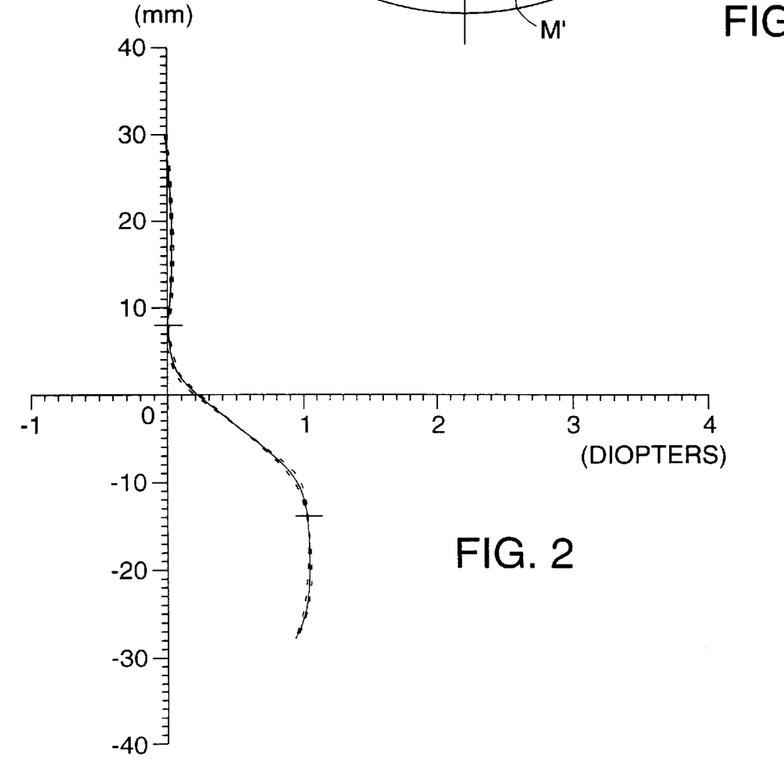
FIG. 2 shows graphically variation in power along the meridian of the lens according to the invention.

FIG. 2 is a a graph showing power along the meridian of the lens according to the intervention, the power addition of this lens being one diopter. The y-axis coordinates of the graph of FIG. 1 are the y-axis coordinates on the lens; the x-axis coordinators give the difference in power, in diopters, from the reference point in the far vision region.

The point having the value y=8 mm on the y-axis along the meridian corresponds to the reference point L for far vision, which, in the case of FIG. 2, is the point of minimum sphere; at this point, mean sphere is 5.2 diopters and cylinder is 0.01 diopters; the point having a y-axis value of −14 mm on the meridian is the reference point P for near vision; at this point, mean sphere is 6.20 diopters and cylinder is 0.01 diopters.

For a progressive multifocal lens, a principal length of progression $L_{pp}$ is defined as a difference in height between the y-axis value of a mounting center and the y-axis value of a point on said meridian at which mean sphere is equal to the sum of mean sphere at said reference point for far vision, plus 85% of said power addition. In the example of FIG. 2, mean sphere is 85% higher than power addition at the far vision reference point at a point of value y=,−8.4 mm; where a mounting center is located at a y-axis value of y=4 mm, the principal length of progression is 12.4 mm.

For a progressive multifocal lens dedicated to near and intermediate vision, the principal length of progression is the ratio between power addition as defined above and the slope of mean sphere along the meridian; this can be written as:

$$L_{pp}=(S_{max}-S_{min})/P_{mer}$$

where $S_{max}$ and $S_{min}$ are respectively the maximum and minimum values of sphere on the meridian, and $P_{mer}$ is the maximum value of the slope of mean sphere along the meridian; slope of sphere corresponds to the maximum modulus of sphere slope with respect to x and/or y. This ratio $L_{pp}$ is equivalent to a length, and represents the length over which mean sphere increases by a value corresponding to power addition.

In both cases, the principal length of progression stands for a position along the meridian corresponding to a variation in mean sphere substantially equal to power addition.

FIG. 2 shows that, at first, sphere remains substantially constant in the far vision region above point L. It shows also that sphere remains substantially constant in the near vision region, around point P. Finally, it shows that the principal length of progression is low, and is notably less than 16 mm. This ensures satisfactory near vision in a region extending above the near vision control point, obviating the need for the wearer to move his head. Comfortable and extensive near vision is thereby ensured. Maximum slope of sphere on the meridian is 0.085 diopters per mm.

Figure 3:
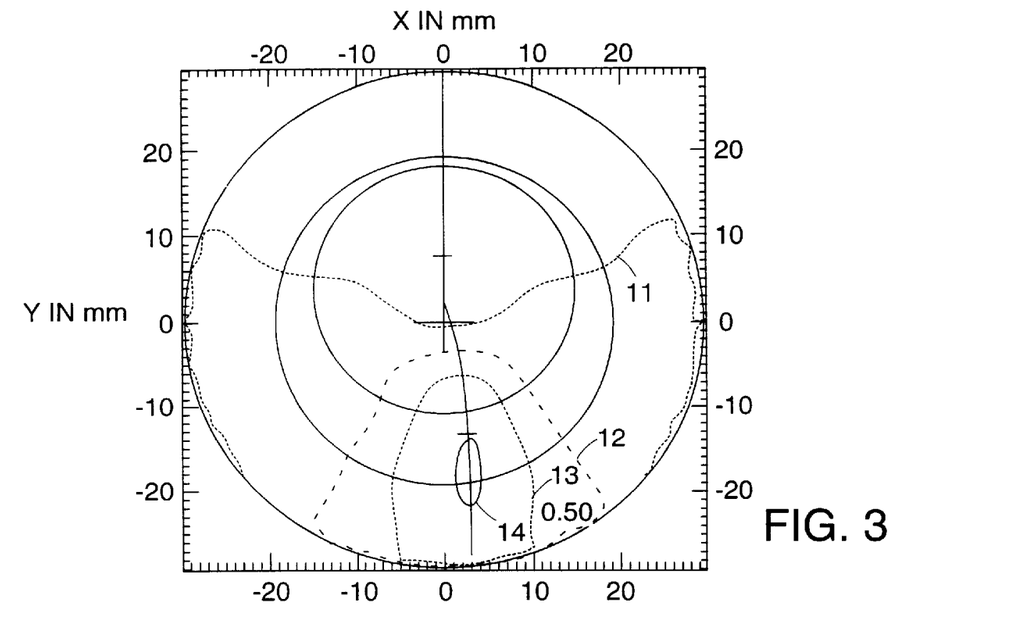
FIG. 3 is a front view of the lens in FIG. 2, showing the main meridian of progression and lines indicating the level of mean sphere.

FIG. 3 is a front view of the lens in FIG. 2, showing the main meridian of progression and lines of equal mean sphere. Those elements shown on FIG. 2 will be found also in FIG. 3 with the addition of isosphere lines. The isosphere lines in FIG. 3 are the lines 11, 12, 13 and 14 representing respectively mean sphere which is greater by 0.25, 0.5, 0.75 or 1 diopter to mean sphere at the far vision control point L. Finally, a 40 mm diameter circle centered on the geometric center of the lens is shown.

Figure 4:
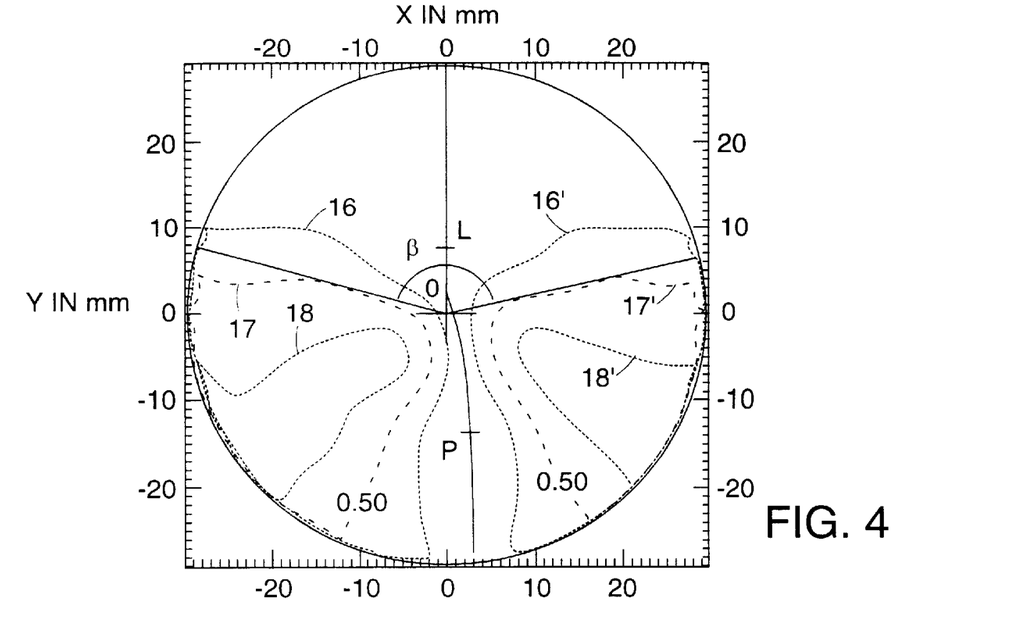
FIG. 4 is a front view of the lens in FIG. 2, showing the main meridian of progression and lines indicating cylinder level.

FIG. 4 is a front view of the lens in FIG. 2, showing the main meridian of progression and lines of equal cylinder. Those elements shown in FIG. 2 are also present in FIG. 4. As cylinder is low along the main meridian of progression, there are two isocylinder lines for each value of cylinder. The isocylinder lines in FIG. 4 are the lines 16 and 16', 17 and 17' and 18 and 18', representing, respectively, a cylinder of 0.25, 0.50 and 0.75 diopters.

As indicated above, in the upper portion of the lens tile border of the far vision region is substantially constituted by the 0.5 isocylinder lines 17 and 17'. The lens of the invention thus has a wide far vision region which extends over almost all of the top half of the lens.

In the lower portion of the lens, the border of the near vision region is also substantially constituted by the 0.5 isocylinder lines 17 and 17'.

The maximum value of cylinder at the surface of the lens, inside the 20 mm radius circle, is 0.88 diopters; this is reached at a point having coordinates x=16, y=8; this maximum value is less than the power addition.

This maximum value is reached on the nasal side; on the temporal side, the maximum value of cylinder is 0.83 diopters and is leached at a point x=−8, y=−6, 10 mm from the geometric center of the lens. The difference between the maximum values of cylinder on the nasal and temporal sides of the lens is less than 0.05 diopters. The invention proposes that this variation be less than 0.1 diopters and preferably less than 0.05 diopters.

Figure 5:
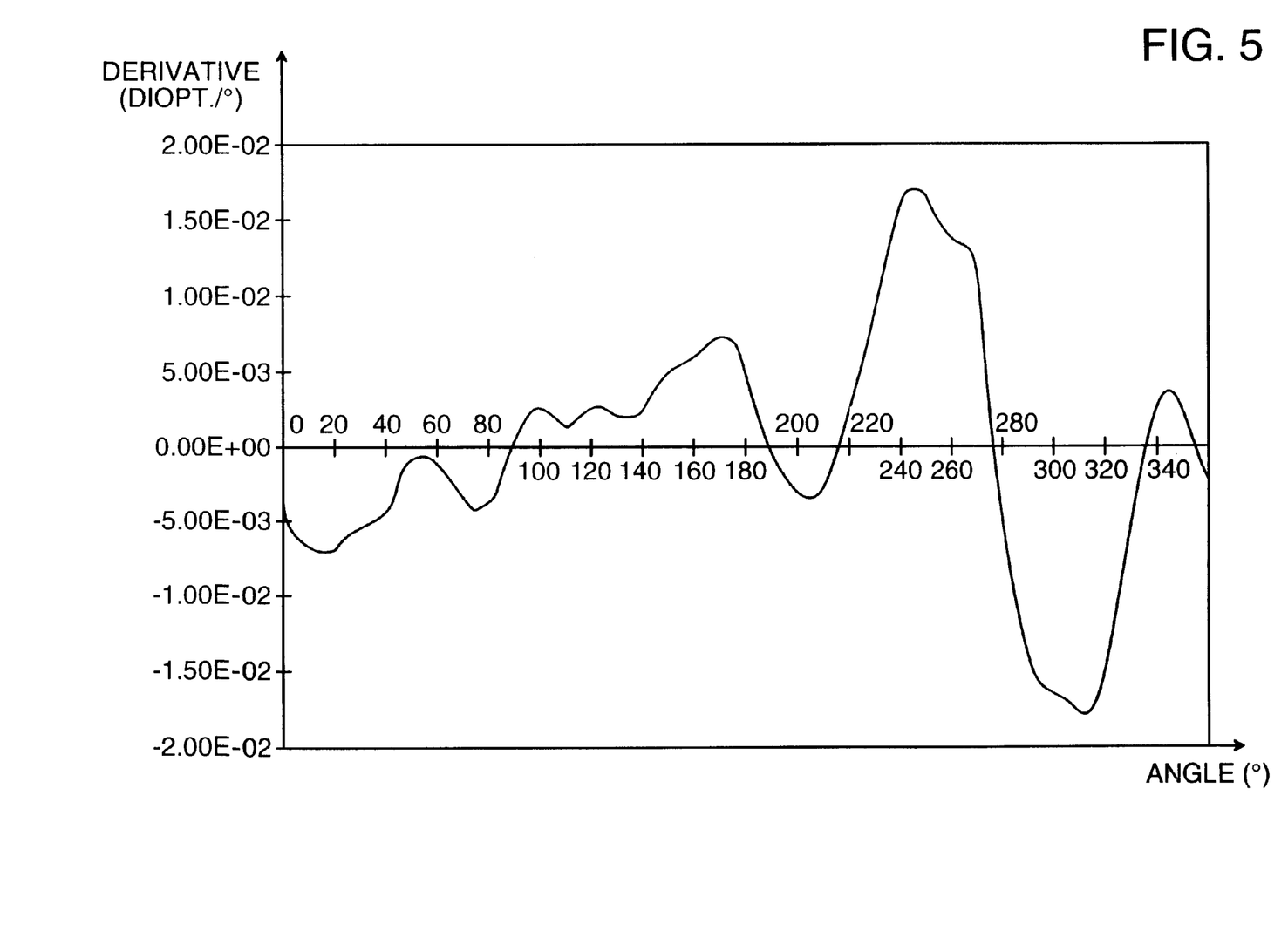
FIG. 5 shows the derivative of sphere as a function of angle on a 20 mm radius circle centered on the geometric center of the lens.

FIG. 5 shows the derivative of sphere as a function of angle, on a 20 mm radius circle centered on the geometric center of the lens; the y-axis is graduated in diopters/°; the x-axis is graduated in degrees, and gives the angle θ that a half-line passing through the center of the 20 mm radius circle makes with the horizontal;

from FIG. 5, it can be seen that the maximum modulus of derivative is 0.018 diopters/° m and is reached for a value of θ near to 310°, i.e. in the lower portion of the lens.

The lens in FIGS. 2 to 5 thus ensures that progression is gentle, adaptation being facilitated for the wearer.

Quantitatively, this is reflected by the following relations:

$$A/P_{mer}<16 \text{ mm} \qquad (1)$$

$$|dS/d\theta|_{max}/P_{mer}<0.25 \qquad (2)$$

and $$C_{max}<A_{nom} \qquad (3)$$

In these relations, $|dS/d\theta|_{max}$ is the maximum modulus value of the tangential derivative of mean sphere on the 20 mm radius circle centered on the geometric center of the lens;

$P_{mer}$ is the maximum value of the slope of mean sphere, along the meridian in diopters per mm;

$C_{max}$ is the maximum value of cylinder inside the 20 mm radius circle mentioned above;

$A_{nom}$ is the nominal value of power addition of the lens in diopters.

The value of 0.25 is thus in mm/°.

Relation (1), as explained above, limits the principal length of progression of the lens.

Relation (2) reflects the fact that variations in sphere are not too sudden along the 20 mm radius circle Instead of a derivative with respect to an angle, one could have used a derivative with respect to a curved x-axis on the circle. The expression tangential derivative of mean sphere on the circle means the derivative of mean sphere with respect to the angle θ that a half-line passing through the center of the 20 mm radius circle makes with the horizontal; calculation of this derivative is a simple mathematical operation.

In this relation, the factor $1/P_{mer}$ is a normalization factor making it possible to compare lenses having different power additions.

The third relation limits variations in cylinder on the surface of the lens.

Combining these two relations ensures isosphere and isocylinder lines are well distributed over the surface of the lens, thereby ensuring very gentle progression of the lens.

Combining relations (1), (2) and (3) is not satisfactory for any of the multifocal ophthalmic lenses of the prior art, tested by the applicant. The invention provides, for the first time, such a distribution of isocylinder and isosphere lines.

Figure 6:
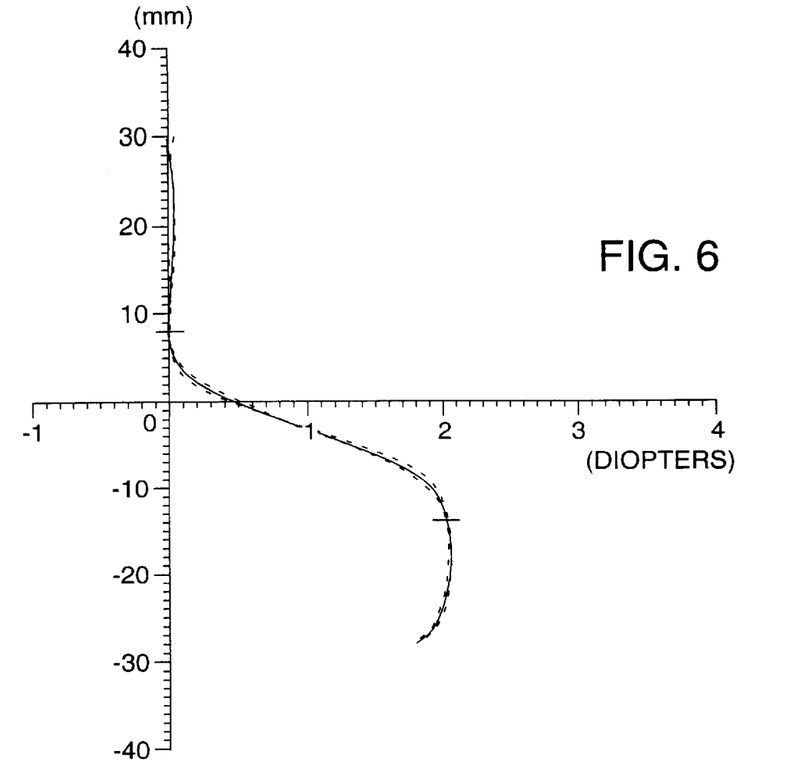
FIGS. 6 to 8 are similar views to those in FIGS. 2 to 4, for a power addition of 2 diopters.
Figure 7:
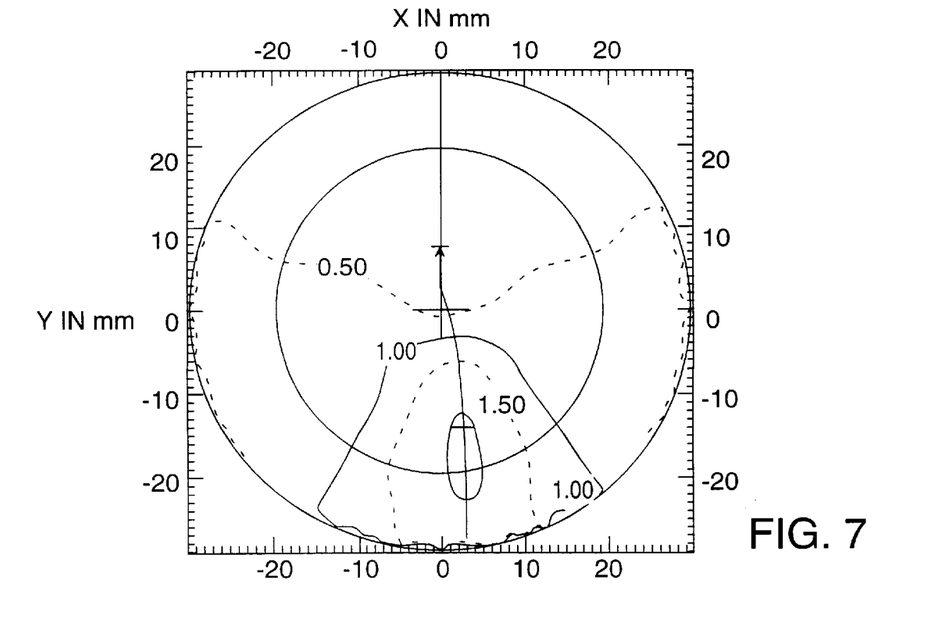
Figure 8:
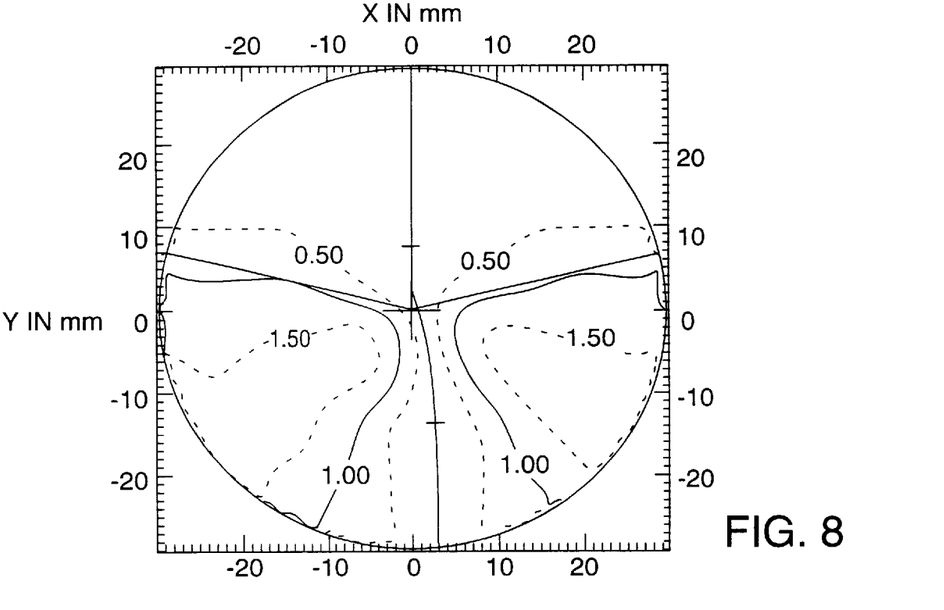
Figure 9:
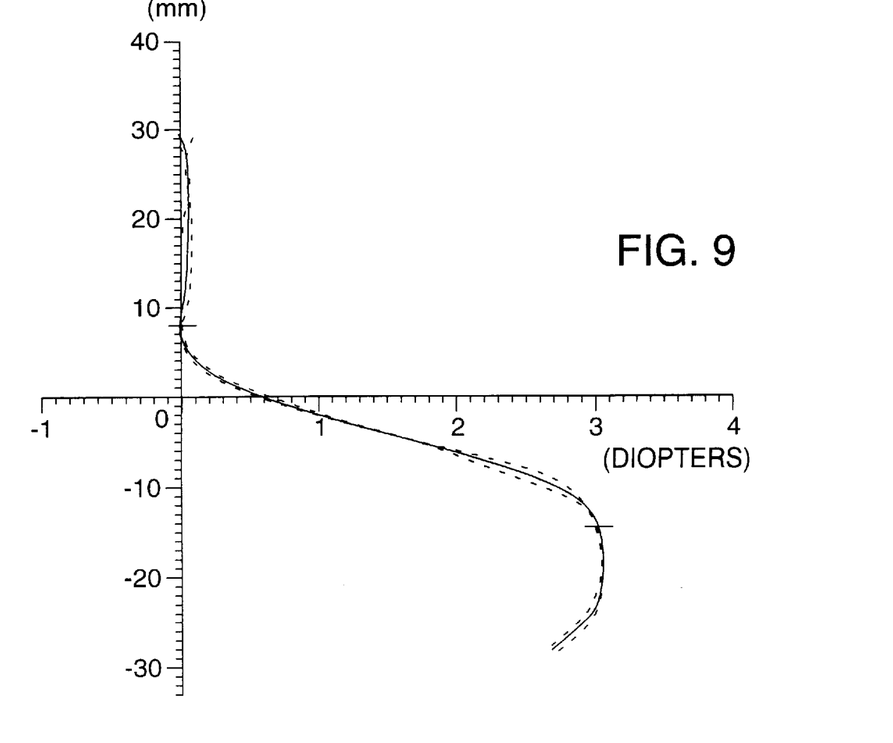
FIGS. 9 to 11 are similar views to those in FIGS. 2 to 4, for a power addition of 3 diopters.
Figure 10:
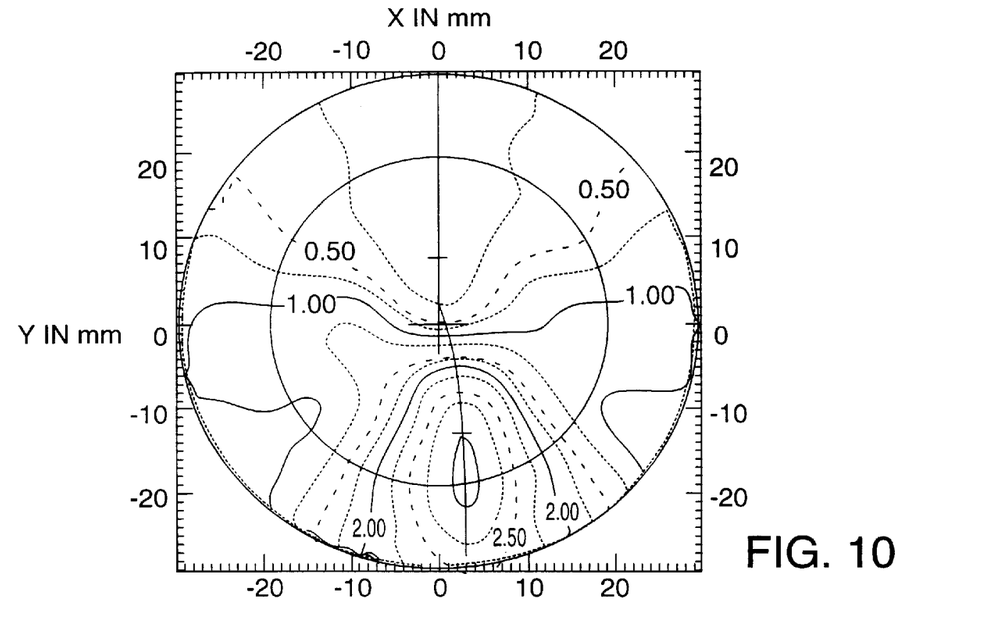
Figure 11:
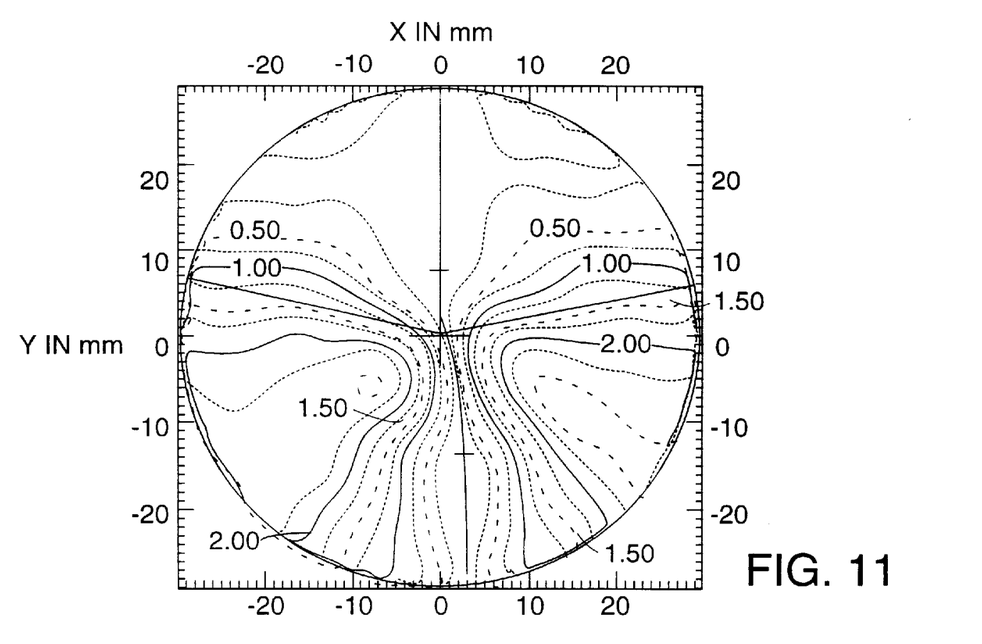

FIGS. 6 to 8 are similar views to those of FIGS. 2 to 4, but for a lens having a power addition of two diopters and FIGS. 9 to 11 are similar to FIGS. 2 to 4 but for a lens having a power addition of 3 diopters. On FIGS. 7 and 8, isosphere and isocylinder lines are respectively shown in 0.50 steps; on FIGS. 9 and 11, isosphere and isocylinder lines are respectively shown in 0.25 diopter steps.

For each lens, the relations (1) to (3) are satisfied. In the case of the lens of FIGS. 2 to 5, we have:

$A/P_{mer}$=12.4 mm $|dS/d\theta|_{max}/P_{mer}$=0.22 and $C_{max}$0.88<$A_{nom}$=1.00 diopters For lenses of 2 and 3 diopter power addition, the ratios (relations 1 and 2) are substantially identical; values of maximum cylinder are as follows:

$C_{max}$=1.75<$A_{nom}$=2.00 diopters on the one hand, and $C_{max}$=2.65<$A_{nom}$=3.00 diopters on the other hand.

The invention provides other advantageous characteristics which, in combination with relations (1), (2) and (3), make it possible to improve the performance of lenses of the invention.

As mentioned above with reference to FIG. 2, the principal length of progression is advantageously less than 16 mm; it is 12.4 mm for the lens of cower addition one diopter, and has substantially the same value for lenses of power addition 2 and 3 diopters. The principle length of progression can preferably fall within ranges that have about 15 mm, about 14 mm, or about 13 mm as an upper limit. The lower limit for such ranges can be, for example, about 12 mm, about 11 mm, or about 10 mm. Most preferably, the principle length of progression is about 12 mm, i.e., in the range of about 12 to 13 mm. In prior art lenses, such a short length of progression would generally lead to distortion at the periphery for the wearer, according to the invention, thanks to the conditions expressed by relations (1), (2) and (3), this short length of progression does not lead to any inconvenience for the wearer.

The invention also provides for the near vision region to have, at the point of reference for near vision, a width of at least 14.5 mm; this width is measured at the y-axis coordinate of point P, between the A/2 isocylinder lines where A is the power addition, defined above. As can be seen on FIG. 3, in the case of power addition of one diopter, the width of the near vision region is 17 mm. For lenses having power additions of two and three diopters, the width of the near vision region is substantially equal to this value.

In one embodiment of the invention, the far vision regions comprises at least one sector formed by two half-lines originating from the geometric center of the lens, their included angle directed towards the upper portion of the lens being about 150°. As can be seen on FIG. 4, in the case of a power addition of one diopter, the angle β between the corresponding half-lines 10 and 19' is 153°. For a power addition of two diopters, just like for a power addition of three diopters, the value is substantially the same. It will be remembered also that the near vision region is limited, at the upper portion of the lens, by lines of isocylinder A/2, where A is the power addition as defined above. The half-lines involved are drawn on FIGS. 8 and 11.

In order to improve binocular vision, the invention further provides for the difference in maximum cylinder, between the two portions of the lens delimited by the main meridian of progression to be less than 0.10 diopter. In the case of FIG. 4, for a power addition of one diopter, maximum cylinder on the nasal side (the right hand side on FIG. 4) is 0.88 diopter; on the temporal side it is 0.83 diopter. For the lens of FIG. 8 (power addition two diopters), the corresponding values are 1.74 and 1.69 diopters; for the lens in FIG. 11 (power addition of three diopters), the corresponding values are 2.65 and 2.60 diopters.

Advantageously, cylinder on the lens is less than power addition, preferably less than 90% of addition. As an example, in the case of a power addition of one diopter, maximum cylinder is 0.88 diopters; it is 1.74 diopters for a power addition of two diopters and 2.65 for a power addition of three diopters.

We shall now give details of the various characteristics that make it possible to provide the various lenses according to the invention. As known per se, the surface of the lenses is continuous and continually derivable three times. As known to those skilled in the art, the surface of progressive lenses is obtained by digital optimization using a computer, setting limiting conditions for a certain number of lens parameters.

A combination of the two relations defined above can be used as limiting conditions, together, it appropriate, with one or several of the criteria defined above.

These criteria apply both for a conventional progressive multifocal lens with a reference point in the far vision region and a reference point in the near vision region, as well as for a multifocal lens that is dedicated to near vision.

One can advantageously start by defining, for each lens of the family, a main meridian of progression. For this, the teachings of French Patent Application FR-A-2,683,642 mentioned above, which is incorporated in its entirety herein by reference, is used. Any other definition of the main meridian of progression can be used, for applying the teaching of the invention.

Obviously, this invention is not limited to what has been described: among other things, the aspherical surface could be the surface facing the wearer of the lenses. Additionally, although there was no mention in the description of lenses which can be different for both eyes, this of course obviously applies.

What is claimed is:

1. A multifocal ophthalmic lens comprising an aspherical surface having at every point thereon a mean sphere and a cylinder, said lens having a power addition and comprising a far vision region VL, a near vision region VP, an intermediate vision region VI, a main meridian of progression MM' passing through said three regions, and a power addition, in which a principal length of progression as defined herein is shorter than 16 mm, a maximum value $|dS/d\theta|_{max}$ of a modulus of the tangential derivative of mean sphere on a 40 mm diameter circle centered on a geometric center of said lens is less than one quarter of the maximum value $P_{mer}$ of a slope of mean sphere along said meridian:

$|dS/d\theta|_{max}/P_{mer} < 0.25$ and a maximum value $C_{max}$ of cylinder inside said circle is less than a nominal power addition of said lens:

$C_{max} < A_{nom}$.

2. The lens according to claim 1, wherein said main meridian of progression is made up by mid-points of horizontal segments joining respective lines formed by points where cylinder is 0.50 diopter.

3. The lens according to claim 1, wherein said near vision region, delimited in an upper portion of said lens by lines formed by points where cylinder is equal to half power addition has a width that is greaser than 14.5 mm at a point of reference for near vision.

4. The lens according to claim 1, wherein said far vision region defined in an upper portion of said lens by lines formed by points where cylinder is equal to half power addition, contains at least one angular sector formed by two upwardly-directed half-lines originating at a geometric center of said lens and having an included angle of at least 150°.

5. The lens according to claim 1, wherein cylinder at the surface of said lens is less than power addition.

6. The lens according to claim 5, wherein cylinder at the surface of said lens is less than 90% of power addition.

7. The lens according to claim 1, wherein a difference in maximum cylinder values at the two portions of said lens delimited by the main meridian of progression is less than 0.1 diopters.

8. The lens according to claim 7, wherein a difference in maximum cylinder values at the two portions of said lens delimited by the main meridian of progression is less than 0.05 diopters.

9. The lens according to claim 1, wherein the lens is a multifocal lens dedicated to near vision and intermediate vision, said lens having a power addition defined as a difference between maximum and minimum values of mean sphere on said meridian of progression, inside a 20 mm radius circle centered on the geometric center of said lens.

10. The lens according to claim 9, wherein the principal length of progression is defined as a ratio between power addition and a maximum value of slope of mean sphere $P_{mer}$ along said meridian.

11. The lens according to claim 1, wherein said lens is a progressive multifocal lens having a reference point for a near vision region, a reference point for a far vision region, and a power addition defined as a difference between the values of mean sphere at these two points.

12. The lens according to claim 11, wherein the principal length of progression is defined as a difference in height between the y-axis value of a mounting center and the y-axis value of a point on said meridian at which mean sphere is equal to the sum of mean sphere at said reference point for far vision, plus 85% of said power addition.

13. A multifocal ophthalmic lens comprising an aspherical surface having at every point thereon a mean sphere and a cylinder, said lens having a power addition and comprising a far vision region VL, a near vision region VP, an intermediate vision region VI, a main meridian of progression MM' passing through said three regions, and a power addition, in which a principal length of progression as defined herein is shorter than 13 mm, a maximum value $|dS/d\theta|_{max}$ of a modulus of the tangential derivative of mean sphere on a 40 mm diameter circle centered on a geometric center of said lens is less than one quarter of the maximum value $P_{mer}$ of a slope of mean sphere along said meridian:

$|dS/d\theta|_{max}/P_{mer} < 0.25$ and a maximum value $C_{max}$ of cylinder inside said circle is less than a nominal power addition of said lens:

$C_{max} < A_{nom}$.

14. The lens according to claim 13, wherein said main meridian of progression is made up by mid-points of horizontal segments joining respective lines formed by points where cylinder is 0.50 diopter.

15. The lens according to claim 13, wherein said near vision region, delimited in an upper portion of said lens by lines formed by points where cylinder is equal to half power addition has a width that is greater than 14.5 mm at a point of reference for near vision.

16. The lens according to claim 13, wherein said far vision region defined in an upper portion of said lens by lines formed by points where cylinder is equal to half power addition, contains at least one angular sector formed by two upwardly-directed half-lines originating at a geometric center of said lens and having an included angle of at least 150°.

17. The lens according to claim 13, wherein cylinder at the surface of said lens is less than power addition.

18. The lens according to claim 17, wherein cylinder at the surface of said lens is less than 90% of power addition.

19. The lens according to claim 13, wherein a difference in maximum cylinder values at the two portions of said lens delimited by the main meridian of progression is less than 0.1 diopters.

20. The lens according to claim 19, wherein a difference in maximum cylinder values at the two portions of said lens delimited by the main meridian of progression is less than 0.05 diopters.

21. The lens according to claim 13, wherein the lens is a multifocal lens dedicated to near vision and intermediate vision, said lens having a power addition defined as a difference between maximum and minimum values of mean sphere on said meridian of progression, inside a 20 mm radius circle centered on the geometric center of said lens.

22. The lens according to claim 21, wherein the principal length of progression is defined as a ratio between power addition and a maximum value of slope of means sphere $P_{mer}$ along said meridian.

23. The lens according to claim 13, wherein said lens is a progressive multifocal lens having a reference point for a near vision region, a reference point for a far vision region, and a power addition defined as a difference between the values of mean sphere at these two points.

24. The lens according to claim 23, wherein the principal length of progression is defined as a difference in height between the y-axis value of a mounting center and the y-axis value of a point on said meridian at which mean sphere is equal to the sum of mean sphere at said reference point for far vision, plus 85% of said power addition.

25. A multifocal ophthalmic lens comprising an aspherical surface having at every point thereon a mean sphere and a cylinder, said lens having a power addition and comprising a far vision region VL, a near vision region VP, an intermediate vision region VI, a main meridian of progression MM' passing through said three regions, and a power addition, in which a principal length of progression as defined herein is in the range of about 12 to 13 mm, a maximum value $|dS/d\theta|_{max}$ of a modulus of the tangential derivative of mean sphere on a 40 mm diameter circle centered on a geometric center of said lens is less than one quarter of the maximum value $P_{mer}$ of a slope of mean sphere along said meridian:

$$|dS/d\theta|_{max}/P_{mer} < 0.25$$

and a maximum value $C_{max}$ of cylinder inside said circle is less than a nominal power addition of said lens:

$$C_{max} < A_{nom}.$$

26. The lens according to claim 25, wherein said main meridian of progression is made up by mid-points of horizontal segments joining respective lines formed by points where cylinder is 0.50 diopter.

27. The lens according to claim 25, wherein said near vision region, delimited in an upper portion of said lens by lines formed by points where cylinder is equal to half power addition has a width that is greater than 14.5 mm at a point of reference for near vision.

28. The lens according to claim 25, wherein said far vision region defined in an upper portion of said lens by lines formed by points where cylinder is equal to half power addition, contains at least one angular sector formed by two upwardly-directed half-lines originating at a geometric center of said lens and having an included angle of at least 150°.

29. The lens according to claim 25, wherein cylinder at the surface of said lens is less than power addition.

30. The lens according to claim 29, wherein cylinder at the surface of said lens is less than 90% of power addition.

31. The lens according to claim 25, wherein a difference in maximum cylinder values at the two portions of said lens delimited by the main meridian of progression is less than 0.1 diopters.

32. The lens according to claim 31, wherein a difference in maximum cylinder values at the two portions of said lens delimited by the main meridian of progression is less than 0.05 diopters.

33. The lens according to claim 25, wherein the lens is a multifocal lens dedicated to near vision and intermediate vision, said lens having a power addition defined as a difference between maximum and minimum values of mean sphere on said meridian of progression, inside a 20 mm radius circle centered on the geometric center of said lens.

34. The lens according to claim 33, wherein the principal length of progression is defined as a ratio between power addition and a maximum value of slope of means sphere $P_{mer}$ along said meridian.

35. The lens according to claim 25, wherein said lens is a progressive multifocal lens having a reference point for a near vision region, a reference point for a far vision region, and a power addition defined as a difference between the values of mean sphere at these two points.

36. The lens according to claim 35, wherein the principal length of progression is defined as a difference in height between the y-axis value of a mounting center and the y-axis value of a point on said meridian at which mean sphere is equal to the sum of mean sphere at said reference point for far vision, plus 85% of said power addition.

37. The lens according to claim 25, wherein the principle length of progression is 12.4.

* * * * *

UNITED STATES PATENT AND TRADEMARK OFFICE
CERTIFICATE OF CORRECTION

| | |
|---|---|
| PATENT NO. | : 6,102,544 |
| APPLICATION NO. | : 09/342946 |
| DATED | : August 15, 2000 |
| INVENTOR(S) | : Baudart et al. |

Page 1 of 1

It is certified that error appears in the above-identified patent and that said Letters Patent is hereby corrected as shown below:

<u>On title page</u>
Please insert the following:
--(30)    Foreign Application Priority Data
   Oct. 16, 1997   (FR) ...................9712990--

Signed and Sealed this

Eighth Day of August, 2006

JON W. DUDAS
*Director of the United States Patent and Trademark Office*